(12) United States Patent
Parviainen-Jalanko

(10) Patent No.: US 9,531,741 B1
(45) Date of Patent: Dec. 27, 2016

(54) CONTROLLING A COMPUTER SYSTEM

(71) Applicant: SSH Communications Security OYJ, Helsinki (FI)

(72) Inventor: Kimmo Parviainen-Jalanko, Helsinki (FI)

(73) Assignee: SSH COMMUNICATIONS SECURITY OYJ, Helsinki (FI)

( * ) Notice: Subject to any disclaimer, the term of this patent is extended or adjusted under 35 U.S.C. 154(b) by 0 days.

(21) Appl. No.: 14/736,783

(22) Filed: Jun. 11, 2015

(51) Int. Cl.
*H04L 29/06* (2006.01)
*G05B 15/02* (2006.01)
*G06F 7/04* (2006.01)
*G06F 17/30* (2006.01)
*H04N 7/16* (2011.01)

(52) U.S. Cl.
CPC ........... *H04L 63/1425* (2013.01); *G05B 15/02* (2013.01); *H04L 63/02* (2013.01)

(58) Field of Classification Search
None
See application file for complete search history.

(56) References Cited

U.S. PATENT DOCUMENTS

| | | | | |
|---|---|---|---|---|
| 2006/0129674 A1* | 6/2006 | Minegishi | ........... | H04L 41/0677 709/224 |
| 2007/0055888 A1* | 3/2007 | Miller | ...................... | G06F 21/32 713/186 |
| 2007/0192580 A1* | 8/2007 | Challener | ............. | G06F 21/575 713/2 |
| 2007/0260429 A1* | 11/2007 | Vera | .................... | G08B 13/1961 702/188 |
| 2008/0168560 A1 | 7/2008 | Durie et al. | | |
| 2008/0229409 A1* | 9/2008 | Miller | ..................... | G06F 21/32 726/19 |
| 2010/0305778 A1* | 12/2010 | Dorneich | ............. | G05D 1/0044 701/2 |
| 2010/0329545 A1* | 12/2010 | Moore | .............. | G06F 17/30256 382/161 |
| 2011/0270794 A1* | 11/2011 | Drory | .................... | G06Q 10/10 706/52 |
| 2013/0219487 A1* | 8/2013 | Ujiie | ..................... | H04L 63/107 726/16 |
| 2014/0251987 A1* | 9/2014 | Reay | .................... | H05B 6/6447 219/756 |

(Continued)

FOREIGN PATENT DOCUMENTS

EP    2129076 A1    12/2009

OTHER PUBLICATIONS

Extended European Search Report issued by the European Patent Office in relation to European Patent Application No. 16171558.6-1853 dated Oct. 25, 2016 (11 pages).

(Continued)

*Primary Examiner* — Shin-Hon Chen
(74) *Attorney, Agent, or Firm* — Robert P. Michal, Esq.; Carter, DeLuca, Farrell & Schmidt, LLP

(57) ABSTRACT

A method and apparatus for control of a computer system are disclosed. The computer system includes a terminal for operator based monitoring of the computer system. A monitoring device is provided to determine information about the state of the operator based monitoring. The information is communicated to a controller of the data security system. The controller then controls the data security system based at least in part on the information.

17 Claims, 2 Drawing Sheets

(56) References Cited

U.S. PATENT DOCUMENTS

2015/0227284 A1\* 8/2015 Tehranchi .............. G05B 23/00
715/835

OTHER PUBLICATIONS

Louis J. Bottino et al., "The Concept of Remote Maintenance Monitoring and Its' Computer Architecture", Digital Avionics Systems Conference, 2004. DASC 04. The 23rd Salt Lake City, UT, USA Oct. 24-28, 2004, Piscataway, NJ, USA, IEEE, US, Oct. 24, 2004 (Oct. 24, 2004), pp. 8.D.3-81, XP010764911, ISBN: 978-0-7803-8539-9 (15 pages).

\* cited by examiner

CONTROLLING A COMPUTER SYSTEM

FIELD OF THE INVENTION

This disclosure relates to controlling a computer system, and more particularly to control of a computer system based on monitoring by an operator.

BACKGROUND

A computer system may need to be monitored by a human operator for various reasons. For example, monitoring of a computer system by a human operator may be desired for security reasons. Incoming and/or outgoing data traffic and/or the system in general for "odd" and unexpected events can be constantly monitored by one or more human operators to prevent malicious data communications and operation in the system. A computer network may also be monitored by an operator for ensuring correct and efficient operation thereof, and to detect possible problems as early as possible to prevent them becoming serious ones. In addition to operator based monitoring and control, security systems such as firewalls and/or other automated security functions can be provided to improve security. These typically operate based on predefined rules such as predefined filtering criteria.

In general, control, and in particular security control, based on operator monitoring is desired since human operators are considered more difficult to be tricked into allowing malicious communications and better in detecting and reacting to unusual and unexpected or otherwise suspicious events in a computer system than e.g. software based automated security systems.

A computer system such as closed network of an organization (e.g. a business, a governmental body and so forth) can have one or more operators who continuously monitor the operation of the network, in particular communications in and out of the system, via appropriate monitoring interface and terminal apparatus. If an operator detects anything usual or suspects malicious actions for any reason, he can take appropriate control actions. For example, he can close any gateway(s) between the monitored system and other system(s) and thus prevent communications with external devices altogether, or selectively prevent and allow in and/or out data communications. Also, the operator can attempt to fixing of problems as soon as these are is detected.

It is noted that the herein discussed matters are not limited to any particular type of computerised system but may occur in any system where monitoring of the operation of the system by an operator may be needed.

SUMMARY

In accordance with an aspect there is provided a method of controlling a computer system, the computer system comprising a data security system and being configured for an operator based monitoring, the method comprising receiving, at a controller of the data security system, a signal comprising information about the state of the operator based monitoring, and controlling, by the controller, the data security system based at least in part on the signal.

In accordance with an aspect there is provided a method for a computer system, the computer system comprising a terminal for operator based monitoring of the computer system, the method comprising determining, at a monitoring device, information about the state of the operator based monitoring, and sending the information to a controller of the data security system for use in controlling the data security system based at least in part on the information.

In accordance with another aspect there is provided control apparatus for a data security system of a computer system configured for an operator based monitoring, the control apparatus comprising at least one processor, and at least one memory including computer program code, wherein the at least one memory and the computer program code are configured, with the at least one processor, to cause the control apparatus to receive a signal comprising information about the state of the operator based monitoring, and control the data security system based at least in part on the signal.

In accordance with a yet another aspect there is provided a monitoring apparatus for a computer system, wherein the computer system comprises a terminal for operator based monitoring of the computer system, the monitoring apparatus comprising at least one controller for determining information about the state of the operator based monitoring and an interface for communicating the determined information to control apparatus of the data security system for use in controlling the data security system based at least in part on the information.

In accordance with more detailed aspects the signal can indicate at least one of the presence state of the operator, activity state of the operator, log in state of the operator, state of the operator determined based on usage of a terminal associated with the operator, and whether the operator has recently performed or is currently performing a control operation on the computer system.

The information about the operator can be provided by and received from an apparatus comprising at least one of a camera, a user interface controller, a processor of a terminal of the operator, a dead man switch, a presence sensor, building access control system, building lighting control system, and a burglar alarm. The apparatus can be configured to determine length of audit backlog.

At least a part of data communications in and/or out of the computer system can be prevented in response to determination that the computer system is not monitored by the operator. Only predefined types of data communications in and/or out of the computer system may be allowed, and other types of data communications prevented in such case. At least a part of data communications in and/or out of the computer system may be buffered until it is determined that the computer system is again monitored by the operator.

The data security system may be switched between different modes of operation based at least in part on information from the monitoring.

Certain more detailed aspects are evident from the detailed description.

BRIEF DESCRIPTION OF THE DRAWINGS

Various exemplifying embodiments of the invention are illustrated by the attached drawings. Steps and elements may be reordered, omitted, and combined to form new embodiments, and any step indicated as performed may be caused to be performed by another device or module. In the Figures.

DETAILED DESCRIPTION

Figure 1:
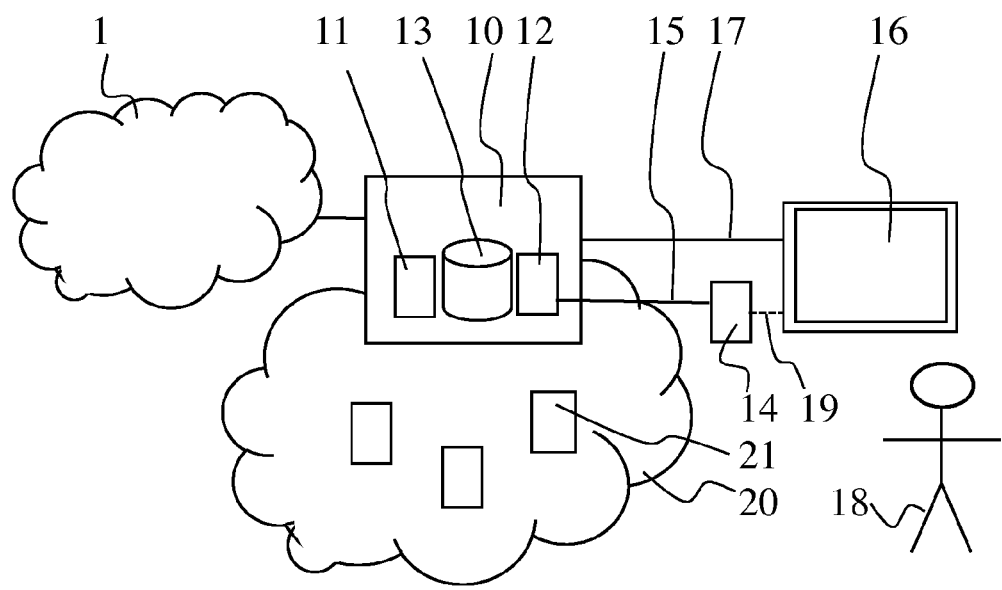
FIG. 1 illustrates an example of a computer network where the invention can be embodied.

FIG. 1 shows an example of a computerized system 1 where the herein described principles may be embodied. The system can comprise, e.g., an Intranet of a business or similar organisation. Communications between the various entities within the system and in and out of the system can be based on e.g. an IPv4 (Internet Protocol version 4) or IPv6 (Internet Protocol version 6). Appropriate security protocol(s) can be applied to the communications.

The exemplifying arrangement of FIG. 1 shows a computer network 20 of an organization, for example, a financial institution, a government body or the like wanting to have high levels of security. A plurality of user terminals 21 are connected to the computer network. Further, FIG. 1 shows a gateway apparatus 10 between the network and any external devices. The gateway apparatus comprises a firewall function 11 configured to provide security on communications in and out of the communication network 20. A gateway typically interfaces a local network with a larger network, for example the Internet 1.

FIG. 1 also shows an operator terminal 16 connected via link 17 to the gateway 10. The terminal is used by an operator 18 to monitor for communications in and out of the computer network 20. The operator can also control the operation of the gateway via the terminal. In addition to the in and out data communications via the gateway, the operator can monitor also other parts of the network, e.g., to detect any failures and/or other security issues, and take appropriate control actions in response to detected events in the network.

FIG. 1 shows also an operator monitoring or sensor device 14 configured to generate information regarding the monitoring state of the operator 18 allocated with the task of monitoring the system. The device 14 is connected via link 15 to a controller 12 provided in the gateway 10. The controller 12 is configured to receive and process signals indicative the operator state from the device 14. For example, the device 14 can determine presence information for the operator 18, and the controller can control operation of the firewall 11 of the gateway accordingly. The device 14 may receive at least some information for the state determination from the terminal via link 19. The device can also be connected to other control systems such as building security and lighting control systems.

In accordance with a possibility the device 14 comprises a presence sensor configured to detect if the operator is by the terminal. For example, a sensor can be configured to determine whether the operator is by the terminal based, e.g., on a sensing element provided in a chair of the operator, on the floor area by the terminal or the like. Other examples include imaging apparatus configured for determining whether the operator 18 is by the terminal 16. For example, a camera can be used to determine whether the operator is watching the display or close to the terminal. A user interface controller of the terminal adapted to generate the indication based on, e.g., key presses and/or touch screen inputs (e.g. based frequency and/or pauses in presses), a processor of the terminal adapted to determine whether the operator is active, for example, actively giving commands via the terminal, a dead man switch, building access control system indicative whether the operator is in the room, building lighting control system indicative whether relevant lights are on, and a burglar alarm system may also be used as the basis of the determination.

In accordance with a possibility a processor of the terminal determines the length of audit backlog of the operator, and if it determines a predefined backlog of unaudited communications or other actions, indicates it generates indication of non-presence of the operator to the controller 12. It can also be determined whether the operator has logged in or has logged out of the terminal 16. The operator activity status or inactivity can be determined based on any type of use of the terminal. For example, any recently performed or currently performed control action would indicate that the operator is present.

In accordance with a possibility the screen saver of the terminal is monitored, and if it is activated, it is determined that the operator is not present.

The presence information can be generated and communicated automatically to the controller 12 at the gateway apparatus. According to a possibility the operator can manually actuate a switch or the like to indicate his presence status.

The indication can be sent on regular intervals and/or with minimum frequency. Predetermined absence of any presence information regarding the operator can be determined by the controller 12 as an indication that the operator is not currently monitoring for the system.

The controller 12 can determine based on the signal from the device 14 whether the operator is monitoring the computer network. If it is determined that there is no operator based monitoring in place, at least a partial restriction on communications in and out from the system, or another control action can be taken. If a part or all of the communications is prevented the operation can be resumed in response to an indication from the sensor 14 that the operator is back and monitoring the system. Thus a security system such as a firewall can be switched according to the presence status of the operator.

In accordance with an option data communications in and or out from the computer network are buffered in the memory of 13 of the gateway 10 until the operator is back and the computer network is again monitored by the operator.

The monitoring and reporting of the operator status can be done substantially in real time. The operation can be combined with temporary short-term buffering of the communications in and out of the network for the periods e.g. when the operator is not looking at the display or is not sitting of his chair.

The operation of the controller 12 and/or gateway 10 can be switched between different modes. For example, a first security mode can be used when the operator is monitoring and a second security mode can be used when the operator is not present. In the first mode less stringent security screening may be applied than in the second mode. In the second mode all data, or predefined types of data, communicated in and/or out of the system may be buffered.

Figure 2:
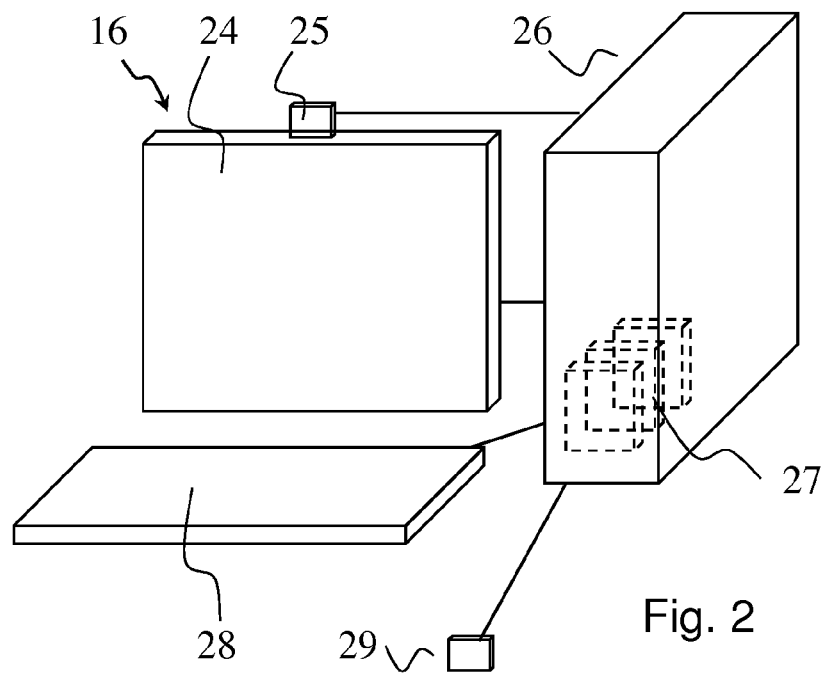
FIG. 2 shows certain examples of an operator terminal and monitoring devices.

FIG. 2 shows certain examples of devices for monitoring the presence state of an operator of terminal apparatus 16. The control part 26 of the terminal apparatus can comprise one or more processors 27. At least one of these can be adapted for control of a display 24 and a keyboard 28. A camera 25 can be directed to the general direction of the operator. A processor unit 27 can be adapted to determine based on the image data whether the operator is by the terminal and/or viewing the display 24.

A sensor 29 is also shown. This can be configured e.g. to indicate for a processor 27 whether an operator is sitting of chair, or otherwise determine the presence of the operator. The detection can be based e.g. on pressure, weight and so on.

One of the processors 27 can also be configured to determine usage based information such as the frequency of key strokes and/or control commands by the operator.

Figure 3:
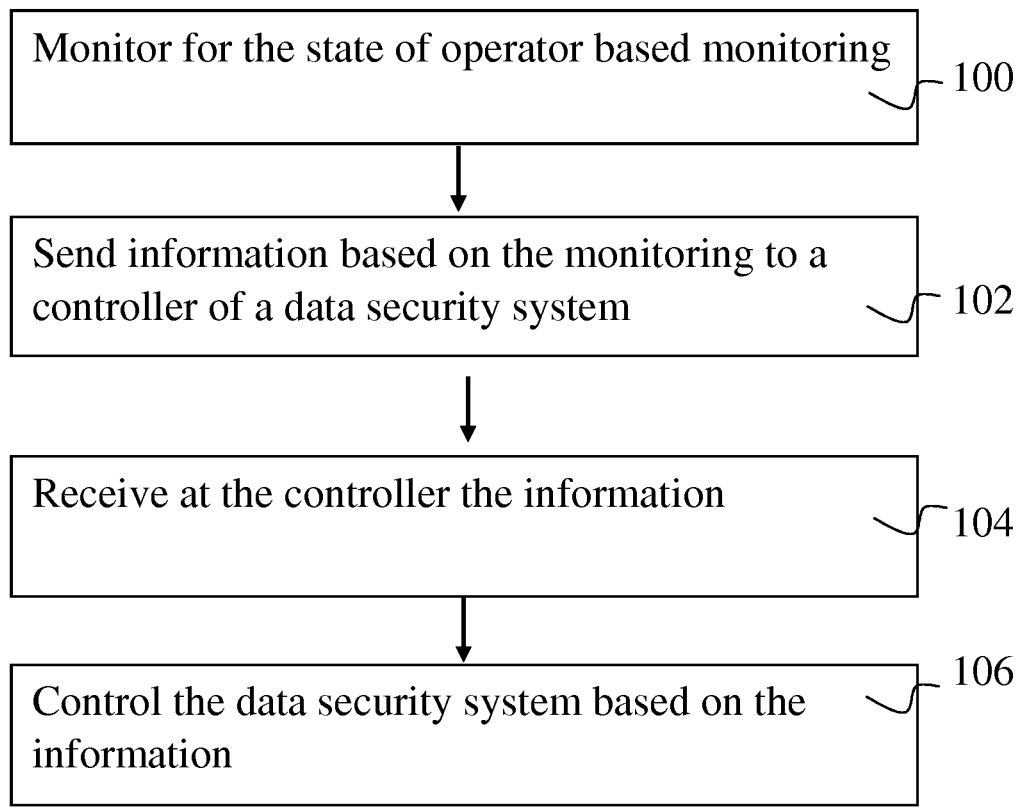
FIG. 3 shows a flowchart in accordance with a certain embodiment.

FIG. 3 shows a flowchart in accordance with an example for controlling a computer system comprising a data security system and configured for an operator based monitoring. An operator status detection device monitors for the state of the operator based monitoring at 100. At 102 information about the state of the operator is communicated to a controller configured to control the data security system. The information can be presence information, or information based on which the presence can be determined. For example, an indication can be sent in response to a detected change in the status of operator based monitoring. The indication can be a single bit, e.g., "1" to indicate that the operator is monitoring and "0" to indicate that the operator is not monitoring, or vice versa. Similarly, a detected change of state can be indicated by a single bit.

The controller of the data security system receives at 104 the signal comprising information about the state of the operator based monitoring. It can then control at 106 the data security system based at least in part on the signal.

The information can be generated and communicated automatically presence information for the operator. The signal can indicate log in state of the operator and/or activity state of the operator that is determined based on usage of a terminal associated with the operator. Also, the state can be determined based on whether the operator has recently performed or is currently performing a control operation on the computer system.

In response to determination that the computer system is not currently monitored by the operator, at least a part of data communications in and/or out of the computer system can be prevented by the controller. Only predefined types of data communications in and/or out of the computer system may be allowed while preventing other types of data communications. When it is determined that the computer system is not currently monitored by the operator, at least a part of data communications in and/or out of the computer system may be buffered until it is determined that the computer system is again monitored by the operator.

Figure 4:
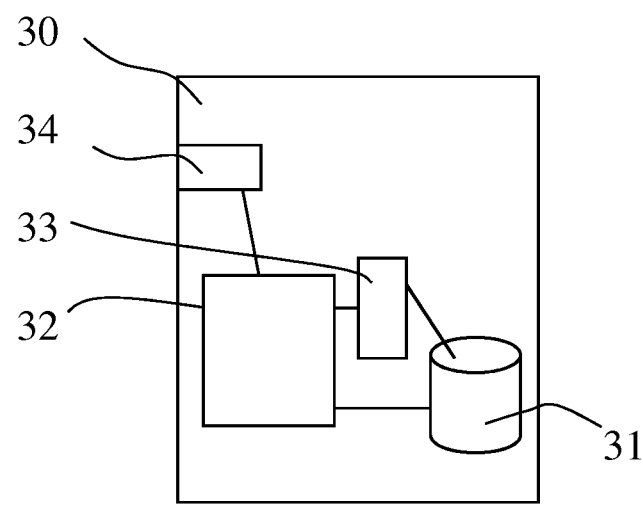
FIG. 4 shows data processing apparatus.

FIG. 4 shows an example of control apparatus for a device capable of processing the above described actions in relation to controlling a security system such as a firewall of another security gateway and/or generation of information for the control.

The control apparatus 30 can be for example integrated with, coupled to and/or otherwise controlling the gateway 10 and/or the monitoring device 14 of FIG. 1. For this purpose the control apparatus comprises at least one memory 31, at least one data processing unit 32, 33 and an input/output interface 34. Via the interface the control apparatus can be coupled to the transport entities of the respective device. The control apparatus can be configured to execute an appropriate software code to provide the control functions. The control apparatus can also be interconnected with other control entities.

The various embodiments and their combinations or subdivisions may be implemented as methods, apparatuses, or computer program products. Methods for downloading computer program code for performing the same may also be provided. Computer program products may be stored on non-transitory computer-readable media, such as memory chips, or memory blocks implemented within the processor, magnetic media such as hard disk or floppy disks, and optical media such as for example DVD and the data variants thereof, CD, magnetic disk, or semiconductor memory. Method steps may be implemented using instructions operable to cause a computer to perform the method steps using a processor and a memory. The instructions may be stored on any computer-readable media, such as memory or non-volatile storage.

The required data processing apparatus may be provided by means of one or more data processors. The described functions at each end may be provided by separate processors or by an integrated processor. The data processors may be of any type suitable to the local technical environment, and may include one or more of general purpose computers, special purpose computers, microprocessors, digital signal processors (DSPs), application specific integrated circuits (ASIC), gate level circuits and processors based on multi core processor architecture, as non-limiting examples. The data processing may be distributed across several data processing modules. A data processor may be provided by means of, for example, at least one chip. The memory or memories may be of any type suitable to the local technical environment and may be implemented using any suitable data storage technology, such as semiconductor based memory devices, magnetic memory devices and systems, optical memory devices and systems, fixed memory and removable memory.

According to an embodiment there is provided a computer program comprising code means adapted to perform, when the program is run on processor apparatus, a method of controlling a computer system, the computer system comprising a data security system and being configured for an operator based monitoring, the method comprising receiving a signal comprising information about the state of the operator based monitoring and controlling the data security system based at least in part on the signal.

According to an embodiment there is provided a computer program comprising code means adapted to perform, when the program is run on processor apparatus, a method for a computer system, the computer system comprising a terminal for operator based monitoring of the computer system, the method comprising determining information about the state of the operator based monitoring, and sending the information to a controller of the data security system for use in controlling the data security system based at least in part on the information.

In general, the various embodiments may be implemented in hardware or special purpose circuits, software, logic or any combination thereof. Some aspects of the invention may be implemented in hardware, while other aspects may be implemented in firmware or software which may be executed by a controller, microprocessor or other computing device, although the invention is not limited thereto. While various aspects of the invention may be illustrated and described as block diagrams, flow charts, or using some other pictorial representation, it is well understood that these blocks, apparatus, systems, techniques or methods described herein may be implemented in, as non-limiting examples, hardware, software, firmware, special purpose circuits or logic, general purpose hardware or controller or other computing devices, or some combination thereof.

The above described principles can be used in any computer system where operator monitoring is provided. The foregoing description provides by way of exemplary and non-limiting examples a full and informative description of exemplary embodiments of the invention. However, various modifications and adaptations may become apparent to those skilled in the relevant arts in view of the foregoing description, when read in conjunction with the accompanying drawings and the appended claims. All such and similar modifications of the teachings of this invention will still fall within the spirit and scope of this invention.

The invention claimed is:

1. A method of controlling a computer system, the computer system comprising a data security system adapted to be monitored by an operator, the method comprising:
   receiving, at a controller of the data security system, a signal comprising information about the state of the data security system that is monitored by the operator, and
   controlling, by the controller, the data security system based at least in part on the signal, wherein
   in response to a determination based on the signal that the computer system is not currently monitored by the operator, preventing at least a part of data communications in and/or out of the computer system, allowing only a predefined type of data communications in and/or out of the computer system and preventing other types of data communications.

2. The method according to claim 1, wherein the signal indicates at least one of presence state of the operator, activity state of the operator, log in state of the operator, state of the operator determined based on usage of a terminal associated with the operator, and whether the operator has recently performed or is currently performing a control operation on the computer system.

3. The method according to claim 1, wherein the information about the operator is received from an apparatus comprising at least one of a camera, a user interface controller, a processor of a terminal of the operator, a dead man switch, a presence sensor, building access control system, building lighting control system, a controller determining length of audit backlog, and a burglar alarm.

4. The method according to claim 1, comprising, in response to determination based on the signal that the computer system is not currently monitored by the operator, buffering at least a part of data communications in and/or out of the computer system until it is determined that the computer system is again monitored by the operator.

5. The method according to claim 1, comprising switching by the controller the data security system between different modes of operation based at least in part on the signal.

6. The method according to claim 1, wherein the data security system comprises a security gateway such as a firewall.

7. A method for a computer system, the computer system comprising a data security system and a terminal adapted to monitor the data security system through an operator, the method comprising:
   determining, at a monitoring device, information about the state of the data security system that is monitored by the operator, and
   sending the information to a controller of the data security system for use in controlling the data security system based at least in part on that information, wherein
   in response to a determination based on the information that the data security system is not currently monitored by the operator, preventing at least a part of data communications in and/or out of the computer system, allowing only a predefined type of data communications in and/or out of the computer system and preventing other types of data communications.

8. The method according to claim 7, wherein the information indicates at least one of presence state of the operator, activity state of the operator, state of the operator determined based on usage of a terminal associated with the operator, and whether the operator has recently performed or is currently performing a control operation on the computer system.

9. The method according to claim 7, comprising determining information about the operator based on at least one of a camera, a user interface controller, a processor of a terminal of the operator, a dead man switch, a presence sensor, building access control system, building lighting control system, length of audit backlog, and a burglar alarm.

10. A control apparatus for a data security system of a computer system adapted to be monitored by an operator, the control apparatus comprising at least one processor, and at least one memory including computer program code, wherein the at least one memory and the computer program code are configured, with the at least one processor, to cause the control apparatus to:
   receive a signal comprising information about the state of the data security system that is monitored by the operator, and
   control the data security system based at least in part on the signal, wherein
   in response to a determination based on the signal that the computer system is not currently monitored by the operator, preventing at least a part of data communications in and/or out of the computer system, allowing only a predefined type of data communications in and/or out of the computer system and preventing other types of data communications.

11. The control apparatus according to claim 10, wherein the signal indicates at least one of presence state of the operator, activity state of the operator, log in state of the operator, state of the operator determined based on usage of a terminal associated with the operator, and whether the operator has recently performed or is currently performing a control operation on the computer system.

12. The control apparatus according to claim 10, configured to, in response to determination that the computer system is not monitored by the operator, buffer at least a part of data communications in and/or out of the computer system until determination that the computer system is monitored by the operator.

13. The control apparatus according to claim 10, configured to switch the data security system between different modes of operation based at least in part on the signal.

14. The control apparatus according to claim 10, wherein the data security system comprises a firewall.

15. A monitoring apparatus for a computer system comprising a data security system, wherein the data security system comprises a terminal adapted to monitor the data security system through an operator, the monitoring apparatus comprising:
   at least one controller device for determining information about the state of the data security system that is monitored by the operator, and
   an interface device for communicating the information to a control apparatus of the data security system for use in controlling the data security system based at least in part on the information, wherein
   in response to a determination based on the information that the computer system is not currently monitored by the operator, preventing at least a part of data communications in and/or out of the computer system, allowing only a predefined type of data communications in and/or out of the computer system and preventing other types of data communications.

16. The monitoring apparatus according to claim 15, configured to generate information indicative at least one of presence state of the operator, activity state of the operator, state of the operator determined based on usage of a terminal associated with the operator, and whether the operator has recently performed or is currently performing a control operation on the computer system.

17. The monitoring apparatus according to claim 11, comprising at least one of a camera, a user interface controller, a processor of a terminal of the operator, a dead man switch, a presence sensor, building access control system, building lighting control system, and a burglar alarm.

* * * * *